United States Patent
Fujiwara

(10) Patent No.: US 10,177,416 B2
(45) Date of Patent: Jan. 8, 2019

(54) DRYING METHOD AND DRYING APPARATUS

(75) Inventor: Hiroki Fujiwara, Isehara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 1369 days.

(21) Appl. No.: 13/698,515

(22) PCT Filed: May 16, 2011

(86) PCT No.: PCT/JP2011/061184
§ 371 (c)(1),
(2), (4) Date: Nov. 16, 2012

(87) PCT Pub. No.: WO2011/145555
PCT Pub. Date: Nov. 24, 2011

(65) Prior Publication Data
US 2013/0055585 A1    Mar. 7, 2013

(30) Foreign Application Priority Data

May 17, 2010  (JP) ................................. 2010-112935

(51) Int. Cl.
*F26B 21/10* (2006.01)
*H01M 10/0585* (2010.01)
(Continued)

(52) U.S. Cl.
CPC ........... *H01M 10/0585* (2013.01); *F26B 5/04* (2013.01); *F26B 21/10* (2013.01); *H01M 10/049* (2013.01)

(58) Field of Classification Search
CPC .... F26B 21/06; F26B 3/00; F26B 5/12; F26B 7/00; F26B 21/006; F26B 9/06; F26B 3/347; F26B 5/04; F26B 21/10; G05D 23/138; H01M 4/23; H01M 10/0585; H01M 10/049; H05B 6/145
(Continued)

(56) References Cited

U.S. PATENT DOCUMENTS 2,110,184 A * 3/1938 Webb .................... F26B 5/04
                                                           34/402
4,343,095 A * 8/1982 Rosen ..................... F26B 7/00
                                                           34/411
(Continued)

FOREIGN PATENT DOCUMENTS

CN           2589914 Y      12/2003
JP       2002-318073 A      10/2002
(Continued)

OTHER PUBLICATIONS

Japanese Office Action dated Sep. 16, 2014, 2 pgs.
(Continued)

*Primary Examiner* — Jessica Yuen
(74) *Attorney, Agent, or Firm* — Foley & Lardner LLP

(57) ABSTRACT

A drying method includes a step of heating an object to be dried provided in a drying chamber to a predetermined temperature, a step of maintaining the predetermined temperature, a step of increasing an air pressure inside the drying chamber to a predetermined air pressure that is higher than an atmospheric pressure, and a step of decreasing the air pressure inside the drying chamber to be lower than the predetermined air pressure.

13 Claims, 6 Drawing Sheets

(51) Int. Cl.
*H01M 10/04* (2006.01)
*F26B 5/04* (2006.01)

(58) Field of Classification Search
USPC ............. 429/120; 34/405; 219/644; 426/447
See application file for complete search history.

(56) References Cited

U.S. PATENT DOCUMENTS

| | | | |
|---|---|---|---|
| 4,560,346 A | 12/1985 | Schulz | |
| 6,713,736 B2* | 3/2004 | Suzuki | H05B 6/145 |
| | | | 118/622 |
| 6,772,537 B2* | 8/2004 | Kawahara | F26B 7/00 |
| | | | 34/402 |
| 8,096,064 B2 | 1/2012 | Matsunaga et al. | |
| 2002/0173109 A1 | 11/2002 | Kishimoto et al. | |
| 2004/0038122 A1* | 2/2004 | Hisamitsu | H01M 2/0212 |
| | | | 429/120 |
| 2004/0060194 A1 | 4/2004 | Kawahara | |
| 2004/0237334 A1 | 12/2004 | Kawahara | |
| 2007/0240300 A1 | 10/2007 | Hasei | |

FOREIGN PATENT DOCUMENTS

| | | |
|---|---|---|
| JP | 2003-222467 A | 8/2003 |
| JP | 2004-335302 A | 11/2004 |
| JP | 3815435 B2 | 8/2006 |
| JP | 2006-324506 A | 11/2006 |
| JP | 2008-179099 A | 8/2008 |
| KR | 2006-0120427 A | 11/2006 |
| TW | 200644110 A | 12/2006 |
| WO | WO 01/95682 A1 | 12/2001 |

OTHER PUBLICATIONS

Korean Office Action dated May 30, 2014, (4 pgs.).
Chinese Office Action dated Jan. 24, 2014, (6 pgs.).
Japanese Office Action dated Feb. 25, 2014, (2 pgs.).

* cited by examiner

FIG.4A  NORMAL STATE
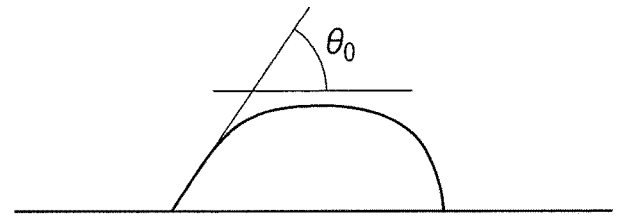
FIG.4B  PRESSURE-INCREASED STATE
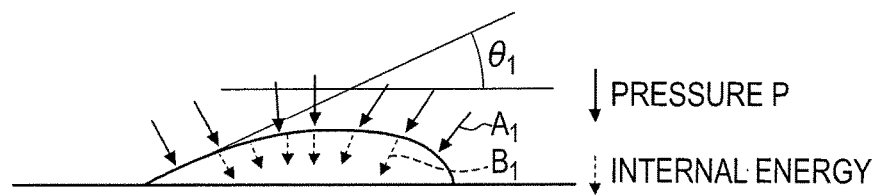
FIG.4C  PRESSURE-REDUCED STATE
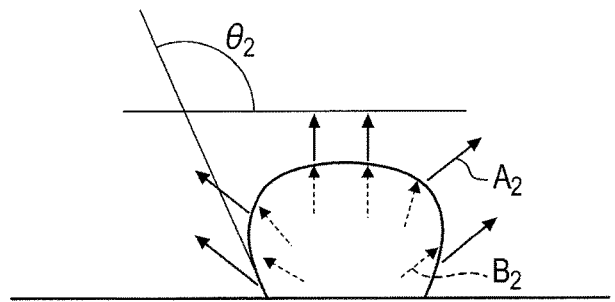

FIG.5

|  |  | DECREASING PERCENTAGE OF MOISTURE (POSITIVE ELECTRODE) | DECREASING PERCENTAGE OF MOISTURE (NEGATIVE ELECTRODE) |
|---|---|---|---|
| DRYING METHOD | ①DRYING IN DRYING CHAMBER KEPT UNDER CONSTANT VACUUM (COMPARATIVE EMBODIMENT) | Δ8.8% | Δ71.1% |
|  | ②THIS EMBODIMENT | Δ14.8% | Δ94.6% |

DRYING METHOD AND DRYING APPARATUS

TECHNICAL FIELD

The present invention relates to a drying method and a drying apparatus.

BACKGROUND ART

There is a need for carrying out drying of objects to be dried quickly. In a manufacturing process of lithium-ion batteries, moisture often adheres to electrodes in particular. When electrolytic solutions are injected to the electrodes to which the moisture adheres, the electrolytic solutions react with the moisture. This results in deterioration of the electrodes.

When a manufacturing environment is controlled constantly at a dew-point temperature (dew-point temperature: −25 degrees Celsius or less), the moisture does not adhere to the electrodes. However, in reality, it is not possible to control the manufacturing environment in such a manner. It is more realistic that the electrodes are dried to remove the moisture just before the electrolytic solutions are injected thereto.

According to WO01/095682, a pressure inside a chamber in which the object to be dried is provided is reduced. The pressure reduction allows a boiling point to decrease. As a result of this, the moisture is evaporated with ease. Thus, a drying time is shortened.

SUMMARY OF INVENTION

According to this technique, however, an evaporation amount of the moisture depends on a degree of pressure reduction. When pressure reduction capacity of the apparatus is brought to the limit, the degree of pressure reduction converges to a fixed degree. At this time, the evaporation amount is also fixed. When the pressure reduction capacity of the apparatus is low, the degree of pressure reduction is small. Then, the evaporation amount is small. In such a case, drying capacity is low. As a consequence, the drying time is shortened to a lesser extent.

The present invention is made in view of these conventional problems, and its object is to provide a drying method and a drying apparatus capable of sufficiently shortening the drying time without increasing its scale.

According to an aspect of the present invention, a drying method is provided which includes a step of heating an object to be dried provided in a drying chamber to a predetermined temperature, a step of maintaining the predetermined temperature, a step of increasing an air pressure inside the drying chamber to a predetermined air pressure that is higher than an atmospheric pressure, and a step of decreasing the air pressure inside the drying chamber to be lower than the predetermined air pressure.

According to another aspect of the present invention, a drying apparatus is provided which includes a drying chamber in which an object to be dried is provided, a temperature regulating mechanism provided in the drying chamber to heat the object to be dried to a predetermined temperature and thereafter maintain the predetermined temperature, and an air pressure regulating mechanism to increase an air pressure inside the drying chamber to a predetermined air pressure that is higher than an atmospheric pressure and then decrease the air pressure.

Hereinafter, embodiments and advantages of the present invention will be explained in detail with reference to the attached drawings.

BRIEF DESCRIPTION OF DRAWINGS

FIGS. 4A-4C are views explaining a mechanism in which moisture release is facilitated at the time of pressure reduction.

FIG. 5 is a table explaining effects of the first embodiment.

EMBODIMENTS OF INVENTION

First Embodiment

Figure 1A:
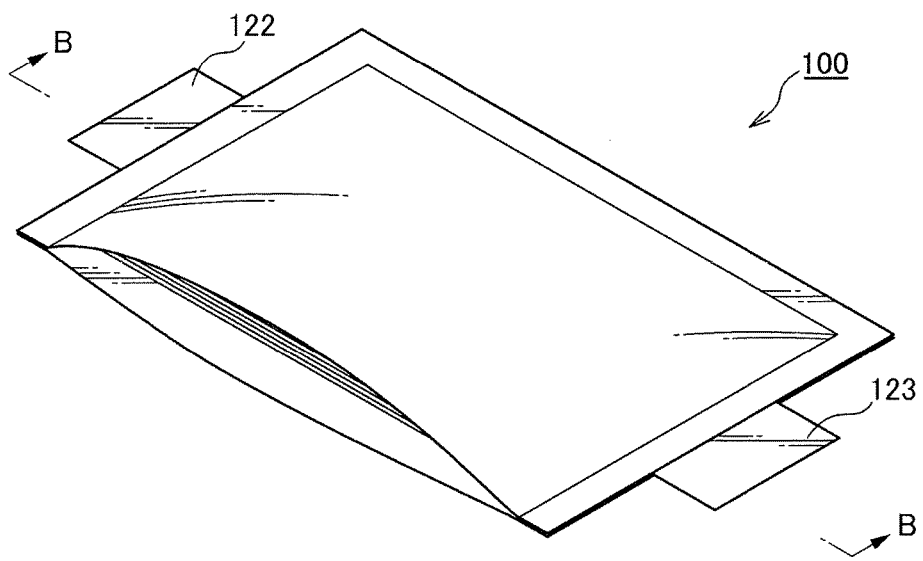
FIGS. 1A and 1B are schematic views of a rechargeable lithium-ion battery used in a first embodiment of a drying apparatus according to the present invention.
Figure 1B:
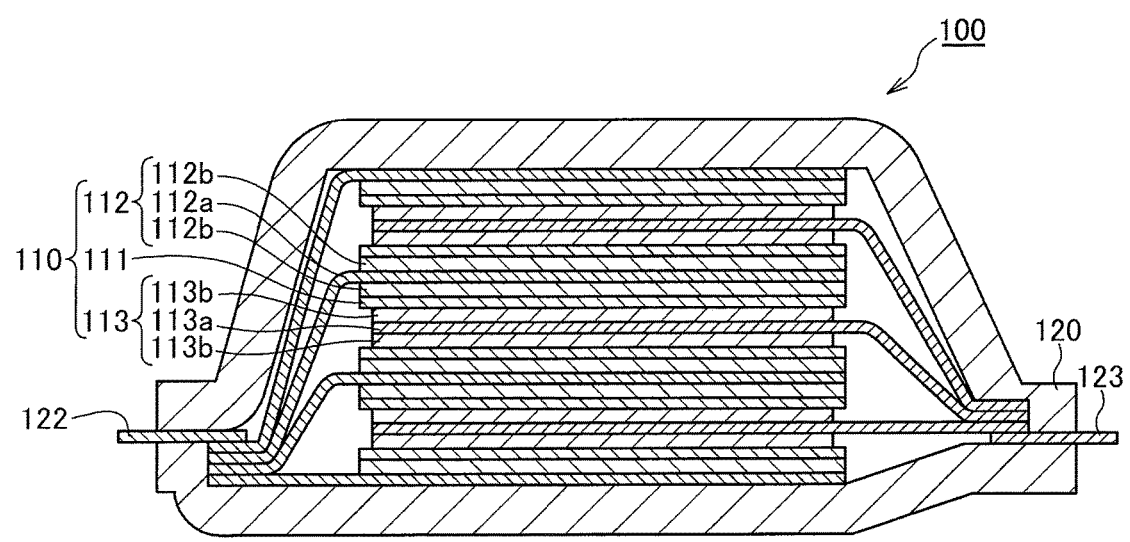

FIGS. 1A and 1B are schematic views of a rechargeable lithium-ion battery used in a first embodiment of a drying apparatus according to the present invention. FIG. 1A is a perspective view of the rechargeable lithium-ion battery. FIG. 1B is a cross-sectional view taken along the B-B line in FIG. 1A.

A rechargeable lithium-ion battery 100 includes a plurality of battery modules 110 and an outer package 120.

A predetermined number of the battery modules 110 are stacked and electrically connected in parallel.

Each of the battery modules 110 includes a separator 111, a positive electrode 112, and a negative electrode 113.

The separator 111 is an electrolyte layer.

The positive electrode 112 includes a thin-plate positive electrode current collector 112a and positive electrode layers 112b formed on both surfaces thereof. It should be noted that the positive electrode 112 that is arranged at an outermost layer has the positive electrode layer 112b on only one surface of the positive electrode current collector 112a. All the positive electrode current collectors 112a are collected as one and electrically connected in parallel. In FIG. 1B, all the positive electrode current collectors 112a are collected as one on the left side. The collected portion forms a positive electrode current collecting portion.

The negative electrode 113 includes a thin-plate negative electrode current collector 113a and negative electrode layers 113b formed on both surfaces thereof. It should be noted that the negative electrode 113 that is arranged at an outermost layer has the negative electrode layer 113b on only one surface of the negative electrode current collector 113a. All the negative electrode current collectors 113a are collected as one and electrically connected in parallel. In FIG. 1B, all the negative electrode current collectors 113a are collected as one on the right side. The collected portion forms a negative electrode current collecting portion.

The outer package 120 houses the plurality of stacked battery modules 110. The outer package 120 is formed by a sheet material of a polymer-metal composite laminate film. The polymer-metal composite laminate film is formed by metal such as aluminum coated by an insulator such as a polypropylene film. While housing the stacked battery modules 110, three sides of the outer package 120 are heat-sealed. The remaining one side is open without being heat-sealed. This side is heat-sealed after an electrolytic solution is supplied therein in a post-process. The outer package 120 includes a positive electrode tab 122 and a negative electrode tab 123. The positive electrode tab 122 and the negative electrode tab 123 are terminals to extract electric power of the battery modules 110 to the outside.

One end of the positive electrode tab 122 is connected to the positive electrode current collecting portion inside the outer package 120. The other end of the positive electrode tab 122 is protruded out of the outer package 120.

One end of the negative electrode tab 123 is connected to the negative electrode current collecting portion inside the outer package 120. The other end of the negative electrode tab 123 is protruded out of the outer package 120.

Figure 2:
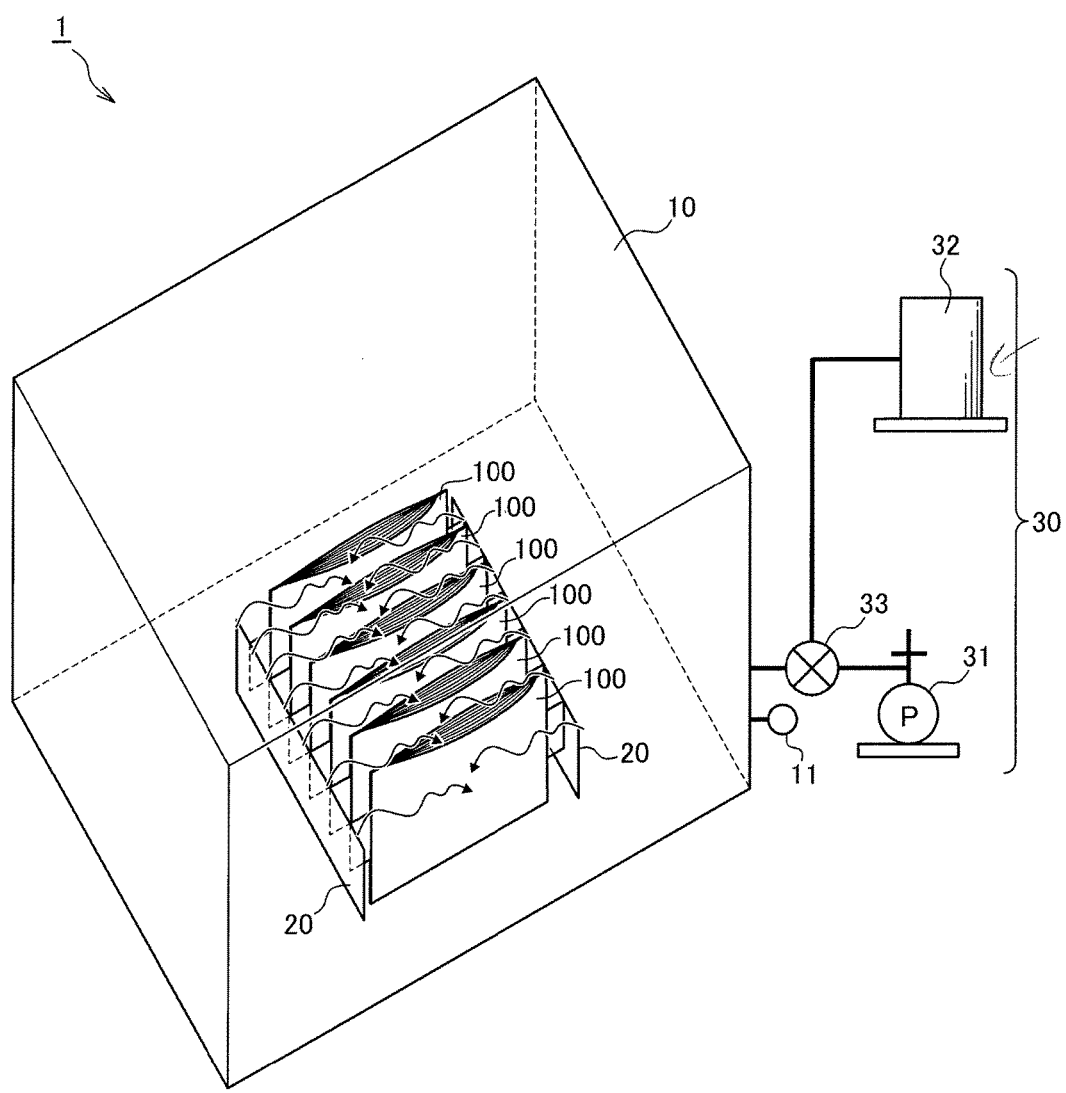
FIG. 2 is a structural diagram schematically showing the drying apparatus according to the first embodiment of the present invention.

FIG. 2 is a structural diagram schematically showing the drying apparatus according to the first embodiment of the present invention. A drying apparatus 1 includes a drying chamber 10, a temperature regulating mechanism 20, and an air pressure regulating mechanism 30.

An object to be dried is provided in the drying chamber 10. It should be noted that the object to be dried according to this embodiment is the rechargeable lithium-ion battery 100 as shown in FIGS. 1A and 1B. The three sides of the rechargeable lithium-ion battery 100 are heat-sealed. The remaining one side is open without being heat-sealed. An air pressure inside the drying chamber 10 is detected by an air pressure sensor 11.

The temperature regulating mechanism 20 is a heater provided in the drying chamber 10. The temperature regulating mechanism 20 heats the rechargeable lithium-ion battery 100 so that the temperature of the rechargeable lithium-ion battery 100, as the object to be dried, reaches a predetermined temperature. Thereafter, the temperature regulating mechanism 20 heats the rechargeable lithium-ion battery 100 so as to maintain the predetermined temperature. In practice, the temperature regulating mechanism 20 heats the positive electrode tab 122 and the negative electrode tab 123. When the temperature regulating mechanism 20 heats the positive electrode tab 122 and the negative electrode tab 123, the heat is transferred to the positive electrodes 112 and the negative electrodes 113 as shown by arrows in the Figure. The drier the rechargeable lithium-ion battery 100 is, the less amount of heat the temperature regulating mechanism 20 supplies. That is, the temperature regulating mechanism 20 adjusts the amount of supplying heat according to a residual moisture content inside the battery. It should be noted that the predetermined temperature may preferably be as high temperature as possible to the extent not exceeding a heat-resistant temperature of a material having the lowest heat-resistant temperature among materials constituting the battery. Further, the predetermined temperature may not be kept at a certain value. In other words, the temperature may be varied as long as the temperature is within a range not interfering with evaporation of the residual moisture.

The air pressure regulating mechanism 30 increases and decreases the air pressure inside the drying chamber 10. The air pressure regulating mechanism 30 includes a vacuum pump 31, an air pressure regulating tank 32, and a three-way valve 33.

The vacuum pump 31 is connected to the drying chamber 10 via the three-way valve 33. The vacuum pump 31 sucks air inside the drying chamber 10. As a result of this, the air pressure inside the drying chamber 10 decreases.

The air pressure regulating tank 32 is connected to the drying chamber 10 via the three-way valve 33. The air pressure regulating tank 32 stores compressed air. The air pressure regulating tank 32 supplies the compressed air to the drying chamber 10. As a result of this, the air pressure inside the drying chamber 10 increases.

The three-way valve 33 switches a communication destination of the drying chamber 10 between the vacuum pump 31 and the air pressure regulating tank 32.

Figure 3:
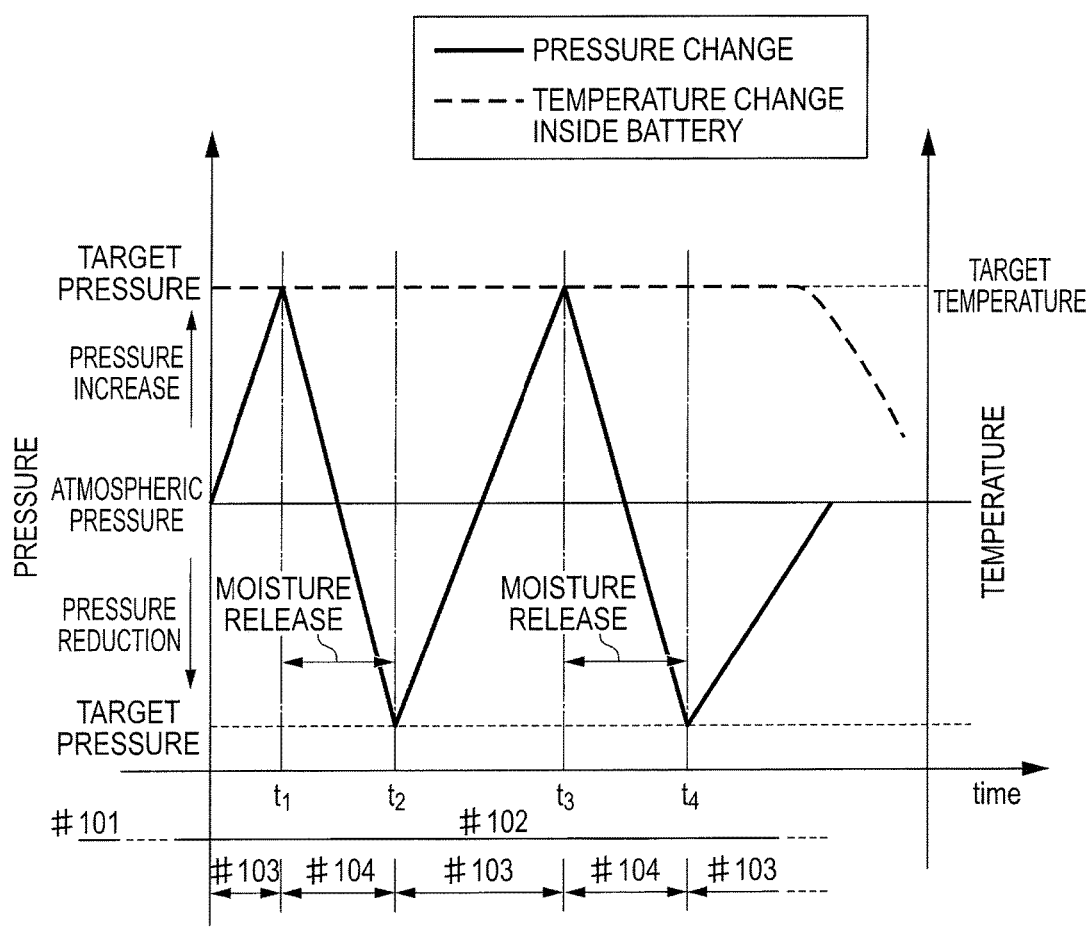
FIG. 3 is a timing chart explaining operation of the drying apparatus according to the first embodiment.

FIG. 3 is a timing chart explaining operation of the drying apparatus according to the first embodiment.

First, the temperature regulating mechanism 20 operates to heat the rechargeable lithium-ion battery 100 provided in the drying chamber 10 to the target temperature (heating step #101). It should be noted that the target temperature may desirably be as high temperature as possible to the extent not exceeding the heat-resistant temperature of the material having the lowest heat-resistant temperature among the materials constituting the battery. Thereafter, the rechargeable lithium-ion battery 100 is heated so as to maintain the temperature (maintaining step #102).

Next, the air pressure regulating mechanism 30 operates to increase the air pressure inside the drying chamber 10 to a predetermined air pressure that is higher than an atmospheric pressure (increasing step #103). Specifically, the three-way valve 33 is switched to allow the drying chamber 10 and the air pressure regulating tank 32 to communicate. Then, the compressed air stored in the air pressure regulating tank 32 is supplied to the drying chamber 10. As a result of this, the air pressure in the drying chamber 10 increases.

When the air pressure in the drying chamber 10 reaches the target air pressure at a time t1, the three-way valve 33 is switched to allow the drying chamber 10 and the vacuum pump 31 to communicate. Then, the vacuum pump 31 sucks the air inside the drying chamber 10. As a result of this, the air pressure in the drying chamber 10 decreases (decreasing step #104).

When the air pressure in the drying chamber 10 reaches a target air pressure at a time t2, the three-way valve 33 is switched again to allow the drying chamber 10 and the air pressure regulating tank 32 to communicate. As a result of this, the air pressure in the drying chamber 10 increases.

The above-described steps are repeated sequentially.

In this way, moisture release is facilitated especially at the time of pressure reduction (for example, the times t1 to t2), and drying time is shortened. This will be explained with reference to FIGS. 4A-4C.

FIGS. 4A-4C are views explaining a mechanism in which the moisture release is facilitated at the time of pressure reduction. FIG. 4A shows a normal pressure state, FIG. 4B shows a pressure-increased state, and FIG. 4C shows a pressure-reduced state.

As shown in FIG. 4A, a contact angle of a water droplet in the normal pressure state is $\theta_0$.

When the air pressure in the drying chamber 10 is increased, as shown in FIG. 4B, the contact angle of the water droplet becomes $\theta_1$ that is smaller than $\theta_0$. Namely, the air pressure operates to press the water droplet to adhere to the material, as shown by solid-line arrows A1. In this state, internal energy is accumulated as shown by broken-line arrows B1.

Next, when the air pressure in the drying chamber 10 is decreased, as shown in FIG. 4C, the contact angle of the water droplet becomes $\theta_2$ that is larger than $\theta_0$. Namely, forces of the air pressure pressing the water droplet are decreased. In this state, the internal energy is released as shown by broken-line arrows B2, to evaporate the water droplet. Further, a boiling point decreases as the air pressure decreases, thus allowing the water droplet to evaporate more easily.

FIG. 5 is a table explaining effects of the first embodiment.

In a comparative embodiment, the rechargeable lithium-ion battery 100 was heated by the temperature regulating mechanism 20 for a predetermined period of time, while the pressure inside the drying chamber was kept under constant vacuum. In this case, a decreasing percentage of moisture was 8.8% for the positive electrode, and 71.1% for the negative electrode.

Meanwhile, according to this embodiment, the decreasing percentage of moisture for the same period of time was 14.8% for the positive electrode, and 94.6% for the negative electrode.

According to this embodiment, in which the pressure inside the drying chamber is increased and decreased, drying of the positive electrode and the negative electrode is easier as compared with the comparative embodiment in which the pressure is kept constant. In other words, the drying time is shortened.

In a manufacturing process of the lithium-ion battery, the moisture adheres to electrodes in particular. When the electrolytic solution is injected to the electrodes to which the moisture adheres, the electrolytic solution reacts with the moisture. This results in deterioration of the electrodes. Therefore, it is necessary to dry the electrodes to remove the moisture before the electrolytic solution is injected thereto. However, the electrodes are located inside the outer package. This makes it difficult to dry the electrodes. When the inside of the outer package is at the high temperature, the moisture adhered to parts inside the outer package is likely to evaporate. However, the battery is configured in a complicated manner by different materials. The material with the low heat-resistant temperature also exists. The temperature should not be higher than the heat-resistant temperature of such a material.

Because of these reasons, it has been difficult to quickly dry the parts inside the outer package.

Meanwhile, according to this embodiment, the temperature regulating mechanism 20 heats the rechargeable lithium-ion battery 100 provided in the drying chamber 10 so that the temperature does not exceed the heat-resistant temperature of the material that constitutes the battery and has the lowest heat-resistant temperature. As the temperature regulating mechanism 20 heats the positive electrode tab 122 and the negative electrode tab 123 in particular, the inside of the outer package is heated. Consequently, the drying can be accomplished quickly.

Then, the air pressure regulating mechanism 30 operates to increase the air pressure inside the drying chamber 10 to the predetermined air pressure that is higher than the atmospheric pressure, and then decrease the air pressure. When the air pressure inside the chamber is higher than the atmospheric pressure, the internal energy is accumulated in the moisture. When the air pressure inside the chamber decreases, the internal energy is released. As a result of this, the moisture evaporates more easily. Especially, when the air pressure inside the chamber is lower than the atmospheric pressure, the boiling point of water decreases. The lower the air pressure inside the chamber compared to the atmospheric pressure, the further the boiling point decreases. As a consequence, the water evaporates easily. Additionally, buoyancy of the moisture adhered to the surface of the material increases, so as to facilitate the moisture release. Thus, the drying time is shortened.

According to the technique of the above-described WO01/095682, an evaporation amount of the moisture depends on a degree of pressure reduction. In order to increase the degree of pressure reduction, it is necessary to increase the capacity of the pump or to increase the thickness of the chamber. This results in an increase in the scale of the apparatus and also an increase in costs. When pressure reduction capacity of the apparatus is brought to the limit, the degree of pressure reduction converges to a fixed degree. At this time, the evaporation amount is also fixed. When the pressure reduction capacity of the apparatus is low and the degree of pressure reduction is small, the evaporation amount is small. In such a case, the drying time is shortened to a lesser extent due to low drying capacity.

On the contrary, according to this embodiment, it is not necessary to increase the degree of pressure reduction. Therefore, it is possible to realize the embodiment without increasing the scale of the apparatus.

Second Embodiment

Figure 6:
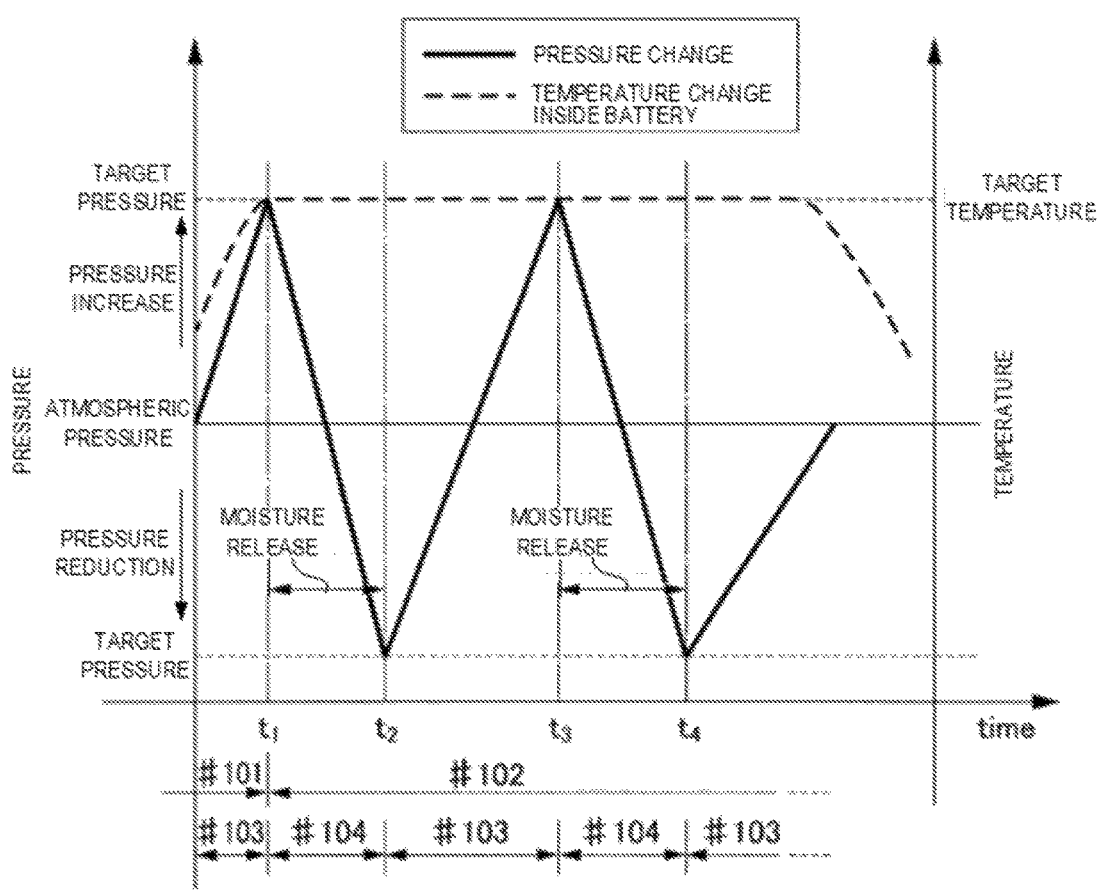
FIG. 6 is a timing chart explaining operation of the drying apparatus according to a second embodiment.

FIG. 6 is a timing chart explaining operation of the drying apparatus according to a second embodiment.

According to this embodiment, the air pressure inside the drying chamber 10 is increased so as to obtain the target air pressure when the rechargeable lithium-ion battery 100 provided in the drying chamber 10 reaches the target temperature (increasing step #103).

In other words, according to this embodiment, the rechargeable lithium-ion battery 100 provided in the drying chamber 10 reaches the target temperature at the time t1. At the same timing, the air pressure inside the drying chamber 10 reaches the target air pressure.

In this way, the drying time is further shortened.

Although the embodiments of the present invention have been explained thus far, only a part of application examples of the present invention is illustrated according to the embodiments, and it is not intended to limit the technical scope of the present invention to the concrete structures of the above-described embodiments.

For example, the air pressure regulating mechanism is not limited to the one as exemplified above. A pump for applying pressure may be used to increase the air pressure.

Further, according to the above-described embodiments, the pressure sensor 11 directly detects whether the air pressure inside the drying chamber has reached the predetermined pressure or not. This is not restrictive, and it may be estimated (indirectly detected) based on a switching time of the three-way valve 33.

The present application claims priority to Japanese Patent Application No. 2010-112935 filed in Japan Patent Office on May 17, 2010. The contents of this application are incorporated herein by reference in their entirety.

The invention claimed is:

1. A drying method comprising:
   a step of heating a part inside of a battery provided in a drying chamber to a predetermined temperature, wherein the predetermined temperature is a temperature that does not exceed a heat-resistant temperature of a material having the lowest heat-resistant temperature among materials constituting the battery, and is equal to or higher than a temperature at which evaporation of residual moisture occurs;
   a step of increasing an air pressure inside the drying chamber to a predetermined air pressure that is higher than an atmospheric pressure; and a step of decreasing the air pressure inside the drying chamber to be lower than the predetermined air pressure, wherein, in the step of increasing the air pressure inside the drying chamber, the air pressure inside the drying chamber is increased so that the air pressure inside the drying chamber reaches the predetermined air pressure when the temperature of the part inside of the battery is made to be the predetermined temperature.

2. The drying method according to claim 1,
wherein, in the step of decreasing the air pressure inside the drying chamber,
the air pressure is decreased lower than the atmospheric pressure.

3. The drying method according to claim 1,
wherein the battery comprises an outer material and electrodes provided inside the outer material.

4. The drying method according to claim 3,
wherein the step of heating the part inside of the battery comprises heating a terminal having one end thereof connected to one of the electrodes inside the outer material and another end thereof protruding out of the outer material.

5. The drying method according to claim 1,
wherein the step of heating the part inside of the battery and the step of increasing the air pressure inside the drying chamber are performed simultaneously, and
wherein the step of decreasing the air pressure inside the drying chamber is performed after the steps of heating the part inside of the battery and increasing the air pressure inside the drying chamber.

6. The drying method according to claim 1,
wherein the step of increasing the air pressure inside the drying chamber is performed after the step of heating the part inside of the battery, and
wherein the step of decreasing the air pressure inside the drying chamber is performed after the step of increasing the air pressure inside the drying chamber.

7. The drying method according to claim 1,
wherein the step of decreasing the air pressure inside the drying chamber is performed after the step of increasing the air pressure inside the drying chamber.

8. The drying method according to claim 1, wherein the step of increasing the air pressure inside the drying chamber to the predetermined air pressure and the step of decreasing the air pressure inside the drying chamber to be lower than the predetermined air pressure are repeated sequentially.

9. A drying apparatus comprising:
a drying chamber in which a part inside of a battery is provided;
a temperature regulating mechanism provided for the drying chamber to heat the part inside of the battery to a predetermined temperature, wherein the predetermined temperature is a temperature that does not exceed a heat-resistant temperature of a material having the lowest heat-resistant temperature among materials constituting the battery, and is equal to or higher than a temperature at which evaporation of residual moisture occurs; and
an air pressure regulating mechanism to increase an air pressure inside the drying chamber to a predetermined air pressure that is higher than an atmospheric pressure and then decrease the air pressure, while the part inside of the battery is at the predetermined temperature,
wherein the air pressure regulating mechanism is configured to increase the air pressure inside the drying chamber such that the air pressure inside the drying chamber reaches the predetermined air pressure when the temperature of the part inside of the battery is made to be the predetermined temperature.

10. The drying apparatus according to claim 9,
wherein the battery comprises an outer material and electrodes provided inside the outer material.

11. The drying apparatus according to claim 10,
wherein the temperature regulating mechanism heats terminals whose one ends are connected to the electrodes inside the outer material and another ends protrude out of the outer material.

12. The drying apparatus according to claim 10,
wherein, the air pressure regulating mechanism decreases the air pressure inside the drying chamber lower than the atmospheric pressure.

13. The drying apparatus according to claim 9, wherein the air pressure regulating mechanism is configured to sequentially repeat increasing the air pressure inside the drying chamber to the predetermined air pressure and decreasing the air pressure.

* * * * *